United States Patent
Studanski

[19]

[11] Patent Number: 6,112,450
[45] Date of Patent: Sep. 5, 2000

[54] ZIGZAG AQUATIC DEVICE AND METHOD

[76] Inventor: Richard R. Studanski, 320 8th St. NE., Sartell, Minn. 56377

[21] Appl. No.: 09/038,712

[22] Filed: Mar. 9, 1998

Related U.S. Application Data

[63] Continuation-in-part of application No. 08/562,501, Nov. 24, 1995, Pat. No. 5,829,184.

[51] Int. Cl.[7] .................................................. A01K 85/00
[52] U.S. Cl. ......................... 43/42.03; 43/42.06; 43/42.5; 43/42.22
[58] Field of Search ................................ 43/42.5, 42.51, 43/42.03, 42.02, 42.06, 42.22; D22/126, 129

[56] References Cited

U.S. PATENT DOCUMENTS

| | | | |
|---|---|---|---|
| D. 138,415 | 8/1944 | Douglass | D22/129 |
| D. 175,926 | 11/1955 | Barr | D22/126 |
| D. 176,311 | 12/1955 | Crosby | D22/129 |
| D. 194,542 | 2/1963 | Hiatt | D22/129 |
| D. 243,086 | 1/1977 | Nothdurft | D22/129 |
| 1,309,966 | 7/1919 | Sebenius | 43/42.5 |
| 1,485,643 | 3/1924 | Streich | 43/42.03 |
| 2,173,540 | 9/1939 | Rayburn | 43/42.03 |
| 2,183,059 | 12/1939 | Bacon | 43/42.03 |
| 2,527,064 | 10/1950 | Hufnagel | 43/42.5 |
| 2,547,264 | 4/1951 | Helman | 43/42.5 |
| 2,553,149 | 5/1951 | Schiffmann | 43/42.06 |
| 2,608,787 | 9/1952 | Krogue | 43/42.5 |
| 2,613,470 | 10/1952 | Eslinger | 43/42.03 |
| 2,680,320 | 6/1954 | Rothbard | 43/42.5 |
| 2,986,812 | 6/1961 | Arter | 43/42.06 |
| 3,153,298 | 10/1964 | Lemon . | |
| 3,305,964 | 2/1967 | Wieszeck | 43/42.03 |
| 3,440,755 | 4/1969 | Nahigian | 43/42.06 |
| 3,570,166 | 3/1971 | Borton | 43/42.03 |
| 3,643,369 | 2/1972 | Jacobson | 43/42.5 |
| 4,201,006 | 5/1980 | Wetherald | 43/42.06 |
| 4,769,940 | 9/1988 | Doss | 43/42.13 |
| 5,119,581 | 6/1992 | Rudolph | 43/42.22 |
| 5,930,942 | 8/1999 | Aurzada | 43/42.5 |

FOREIGN PATENT DOCUMENTS

| | | | |
|---|---|---|---|
| 219551 | 1/1959 | Australia | 43/42.51 |

*Primary Examiner*—Kurt Rowan
*Attorney, Agent, or Firm*—Albert W. Watkins

[57] ABSTRACT

A method and apparatus wherein an aquatic device tethered by a single line provides an accentuated zigzag or oscillating movement when the device has a relative speed with respect to water. The device may be either buoyant or submergible. The device has a frame, a pair of pintles, a tow or retrieval structure for connection to a line, and a bi-stable guidance vane which snaps from port to starboard to port and so on to cause the device to produce a zigzag pattern from right to left to right and so on, without electrical control or power. Alternative embodiments are illustrated which incorporate a forward mouth-like structure which directs water alternatively across one major surface of the device and then the other, without requiring the pintles of the first embodiment.

8 Claims, 11 Drawing Sheets

ZIGZAG AQUATIC DEVICE AND METHOD

CROSS REFERENCE TO RELATED APPLICATIONS

This application is a continuation-in-part of U.S. application Ser. No. 08/562,501, filed on Nov. 24, 1995 presently allowed, the entire contents which is incorporated herein by reference now U.S. Pat. No. 5,829,184.

BACKGROUND OF THE INVENTION

1. Field of the Invention

This invention pertains to a method and apparatus for providing zigzag movement to an aquatic device, such as an otter or fishing lure.

2. Description of the Related Art

Aquatic outriggers, otters and diving devices are well known. Fishing bait that incorporates movement is well known. However, the vast majority of these baits fail to simulate the large directional changes made by many natural aquatic creatures, and so provide less than ideal simulation of the natural aquatic life.

Lemon, in U.S. Pat. No. 3,153,298, illustrates a fishing bait having a bi-stable vane designed to generate a zigzag motion of the bait while being pulled through water. However, in the Lemon reference, the tail portion of the fishing device is relatively rigid, as is the front portion, and these sections are divided by a hinged portion. The hinge disclosed therein is prone to sticking and jamming, which leads to frequent operational failure during use. The hinges also require undesirable manufacturing steps. Furthermore, with the lack of flexibility within the head and tail sections, the fishing device of Lemon is highly prone to entering into a stalled state where the device no longer operates bi-stably, but instead pulls slightly off-center with a fixed orientation between the head and tail sections. This off-center drag will lead to the fishing device surfacing and skipping undesirably across the top of the water, without attaining the desired bi-stable zigzag motion through the water.

SUMMARY OF THE INVENTION

An aquatic device for providing zigzag motion has a frame, a line connector, a pair of pintles on the frame, and a bi-stable guidance vane which is relatively flexible and which snaps back and forth between the pintles to make the device go left, then right, then left and so on, or up and down as the case may be, as the device is given a relative velocity in water.

A guidance vane for an aquatic device is devised of an elongate flat resilient planar sheet, and has a journal on each end and tension structure between the journals which compresses a main section of the vane into a bowed geometry relatively bi-stable to either side of the tension structure.

A method of providing self-steering zigzag motion in an aquatic device has the steps of providing a frame, mounting a flat plastic guidance vane in compression upon the frame and holding the vane in bi-stable curved position, moving the device through water with a tether line, causing the vane to repetitively snap back and forth, thereby causing the device to effect a significant zigzag motion in the water.

A fishing bait includes a leading edge connection point to which a tow line or similar attachment may be made; a tow structure which flares transversely from the tow structure and which opens in the center thereof; a nose structure adjacent the tow structure that engages the tow structure at two transversely spaced points thereby closing said central opening, the nose structure which may extend into the open center section towards the connection point; and a flexible vane extending longitudinally from the nose structure. The fishing bait may further include special floats, weights and/or tensioning wires, as well as molded features or attachments to make the bait resemble aquatic life.

OBJECTS OF THE INVENTION

An object of this invention to provide a method and apparatus for towed aquatic devices that provides large zigzag or oscillating motion. A further object of this invention is to provide a new guidance vane for a towed aquatic device. Another object of this invention is to provide a self-steering towed aquatic device. Yet a further object of this invention is to provide a low cost bait which can be made to very closely simulate both the appearance and motion of a variety of aquatic life. These and other objects and aspects of the invention will become manifest to those versed in the art, upon review of the teachings herein and with experience herein.

DESCRIPTION OF THE PREFERRED EMBODIMENT

In accordance with the principles of this invention, a new and improved aquatic device is shown in full or in part in FIGS. 1–17 for practice of the present invention, and is generally indicated by the numeral 10.

The basic zigzag aquatic device 10 as shown in FIGS. 1–6 has a frame 12, a tow bar 14, a guidance vane 16 and a pair of vane pintles 18 which mount and hold the vane 16 to the frame 12. The normal operative waterline in FIGS. 1, 6, 7 and 19 is designated by "W.L.".

Figure 3:
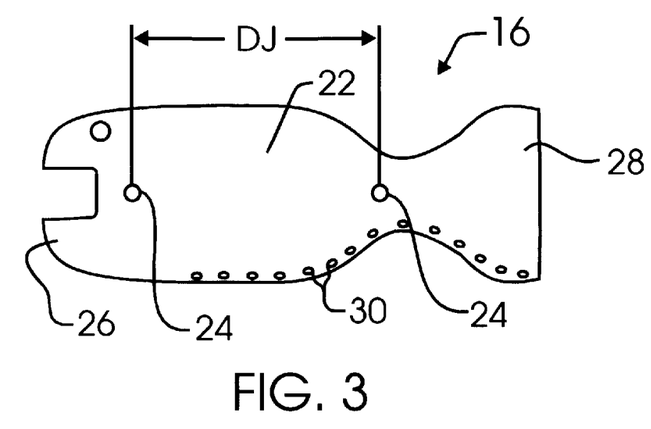
FIG. 3 is an elevational side view of a guidance vane for the structure of FIG. 1.
Figure 4:
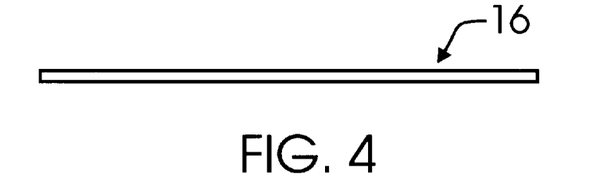
FIG. 4 is a top plan view of the structure of FIG. 3.
Figure 5:
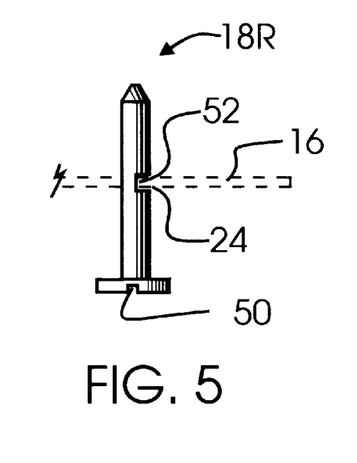
FIG. 5 is a plan view of the adjustable pintle in the structure of FIG. 1.
Figure 6:
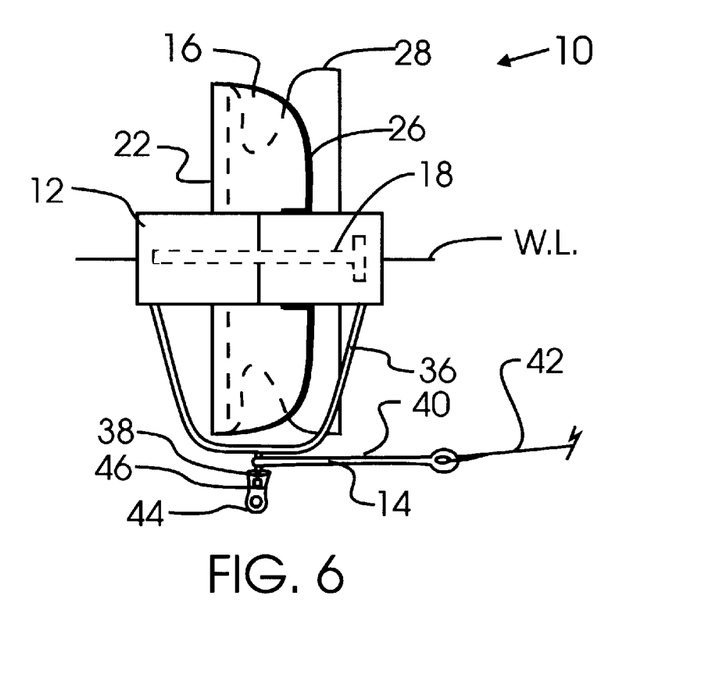
FIG. 6 is an elevational front end view of the structure of FIG. 1.

The frame 12 is relatively rigid and does not flex in normal use. It also is buoyant and floats in water. The frame 12 has an interior vane recess 20 into which the vane 16 is loosely fitted. The pintles 18 then are secured in the frame 12. The guidance vane 16, as clearly shown in FIGS. 3 and 4, is an initially and normally flat sheet of resilient plastic. Guidance vane 16 has a central main vane section 22 between a pair of spaced apart journals 24, which journals are apertures through vane 16. Vane 16 has a contiguous nose 26 forward of front journal 24, and a tail 28 rearward of rear journal 24. The cross-sectional area of tail 28 exceeds the cross-sectional area of nose 26, and the cross-sectional area of main vane section 22 is greater than the combined area of both nose 26 and tail 28. Along the lower edge of vane 16 in main section 22 and tail 28 are a plurality of load apertures 30 to which may be connected ballast weights or a line and working load 32 which may be a fish lure, instrument, or other underwater implement. On the front of the frame 12 is a typical pointed nose and an optional weed deflector 34. On the underside of the frame 12 is tow bar 14 which has down hoop 36. At the bottom of hoop 36 is a tow pintle 38 to which is rotatably mounted a swivel tongue 40 having a front eye for being connected to a tow or pull line 42. Line 42 provides power to device 10 for motion thereof with respect to water. On the bottom of tow pintle 38 is a work line guide 44 connected thereto by a load sensitive release coupling 46. A work line 48 is threaded through guide 44, and tow pintle 38 is positioned in close longitudinal proximity to front pintle 18.

Figure 2:
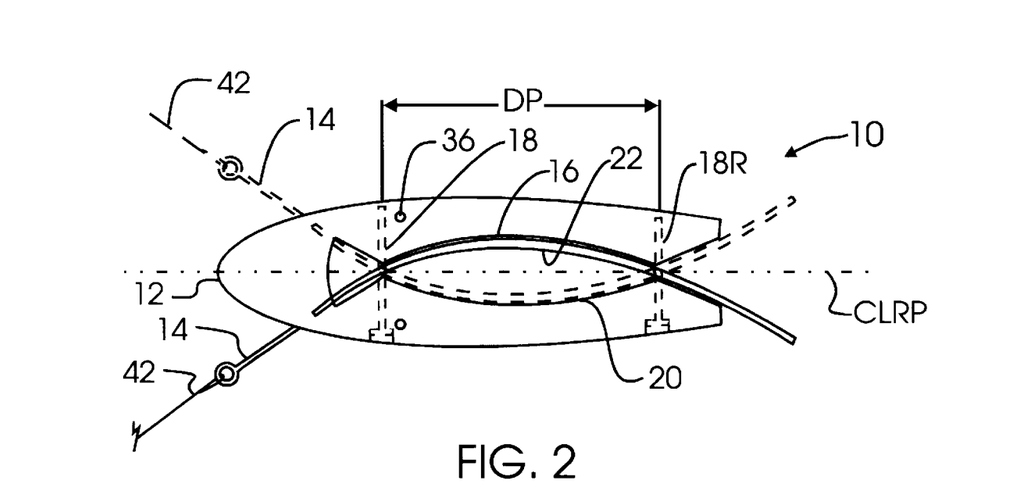
FIG. 2 is a top plan view of the structure of FIG. 1.
Figure 9:
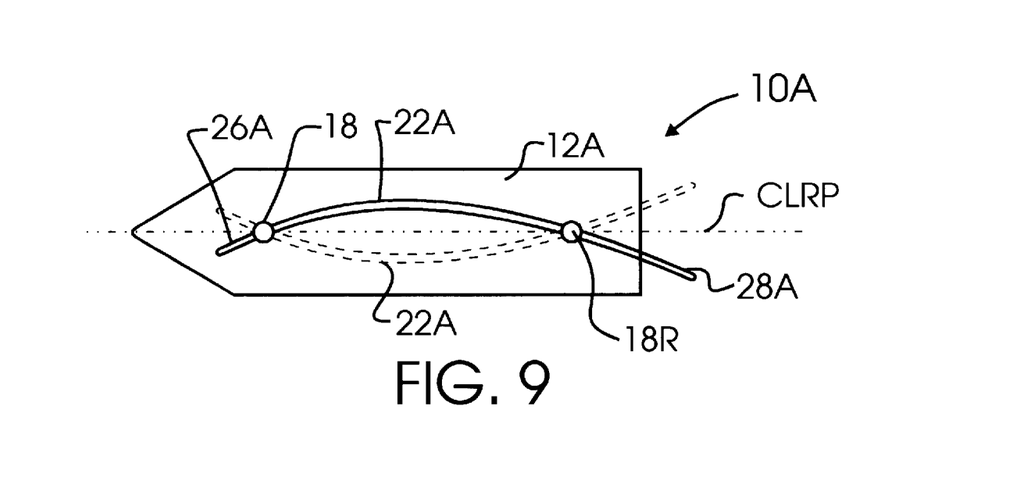
FIG. 9 is a schematic bottom plan view of the structure of this invention.

An important feature of this invention is that the main vane section 22 is placed under compression in the frame 12 by the method of spacing the pintles 18 longitudinally from each other a predetermined distance, "DP" which is less than the distance between the vane journals, "DJ". Consequently, when guidance vane 16 is installed in frame 12 and pinned, the pintles 18 compress and bow the main vane section 22 as best shown in FIG. 2. The longitudinal reference plane of device 10 is indicated in FIGS. 2 and 9 and designated as "CLRP". The guidance vane 16 is not stable on the CLRP, but is bi-stable in a pair of bowed and curved positions as shown in solid line and dotted line in FIG. 2. The guidance vane 16 snaps back and forth between these bi-stable positions, and has a tendency to stay in whichever position it is in. The rear pintle 18R, FIG. 5, has a tool head 50 and a cam section 52 which enables rear pintle 18R to be turned to adjust the compression of main vane section 22 to less or more compression, to thereby adjust the zigzag course of the device 10 from a less to a more accentuated course.

Figure 7:
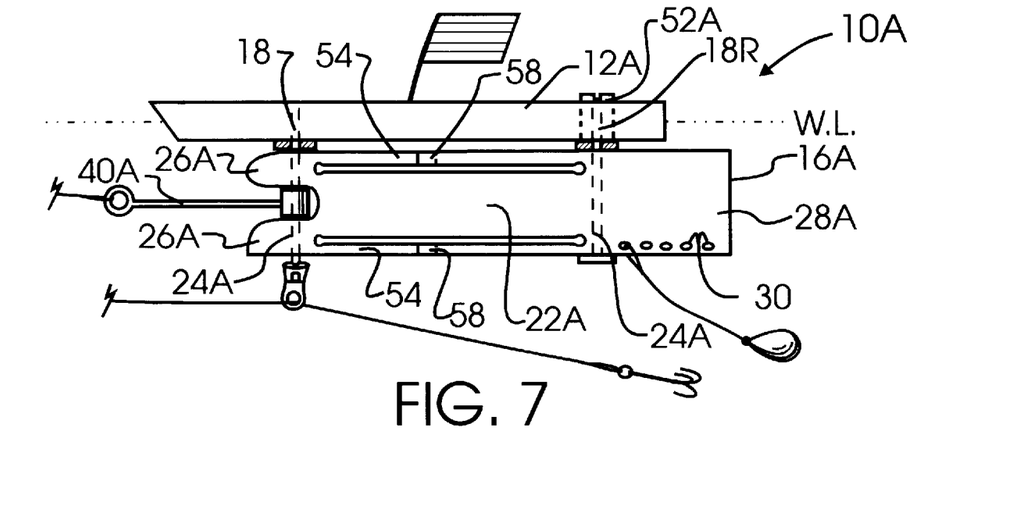
FIG. 7 is an elevational side view of an alternative embodiment of an aquatic device according to this invention.
Figure 8:
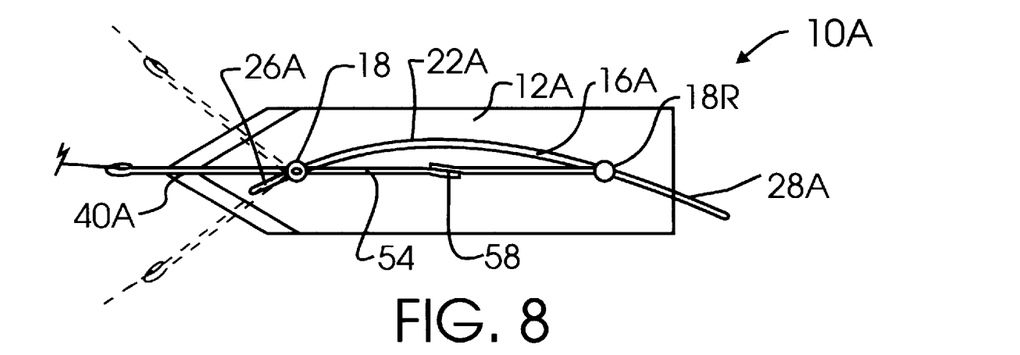
FIG. 8 is a bottom plan view of the structure of FIG. 7.

FIGS. 7 and 8 illustrate a preferred alternative device 10 having a frame 12A which is rigid and buoyant and has a pointed front end. Extending downward from the frame are pintles 18 and 18R, and totally below frame 12A is guidance vane 16A. Swivel tongue 40A is rotatably mounted on front pintle 18 below frame 12. Guidance vane 16A has main vane section 22A, a split nose 26A, tail 28A, load apertures 30 and journals 24A, and may have an adjustment cam 52A.

Figure 13:
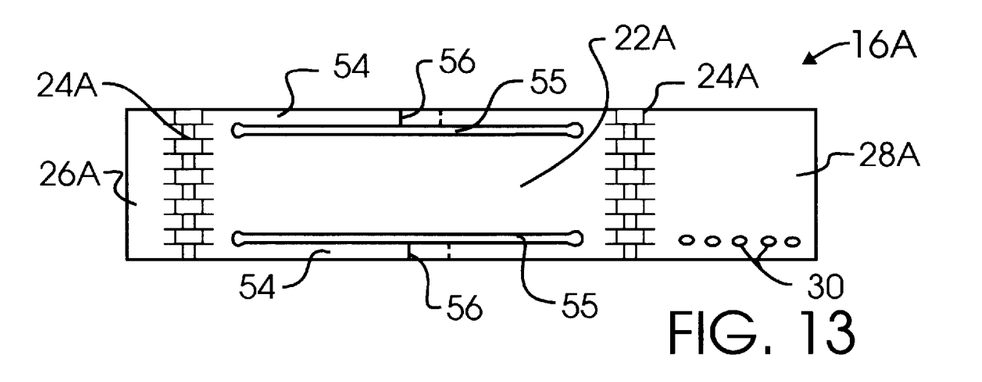
FIG. 13 is a side plan view of the guidance vane in FIG. 7.
Figure 14:
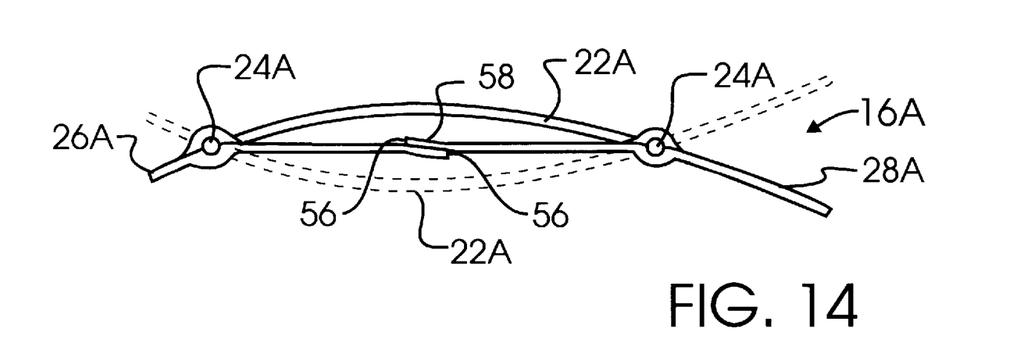
FIG. 14 is an end view of the structure of FIG. 13.

The important feature of this new guidance vane 16A is that it has at least one and preferably a pair of tension members 54 inside of journals 24A. Referring to FIG. 13, an initially flat sheet of plastic is cut or molded with separation slots 55 between tension member 54 and main vane section 22A. Tension members 54 are given end cuts 56 and then, as best shown in FIG. 14, the individual tension members 54 are pulled together, overlapped and welded together by an appropriate process such as sonic welding, at a central shortening joint 58. This effective shortening of the re-joined tension members 54 places main vane section 22A under compression and causes main vane section 22A to bow as shown in FIGS. 8 and 14. Main vane section 22, nose 26A and tail 28A then become bi-stable as shown in FIG. 14 and previously described. This guidance vane 16A is then placed upon the pintles 18, 18R of frame 12A, and appropriately retained. With this vane 16A, the journals 24A are generally equidistant with the pintles 18, 18R of frame 12A.

Figure 10:
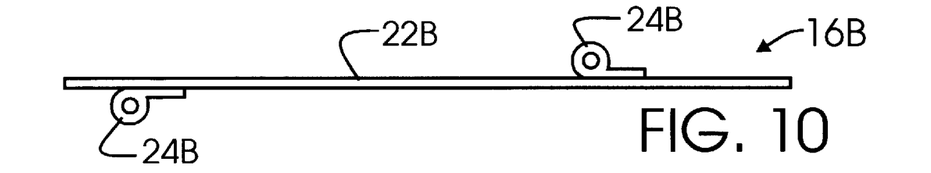
FIG. 10 is a side view of an alternative guidance vane.
Figure 11:
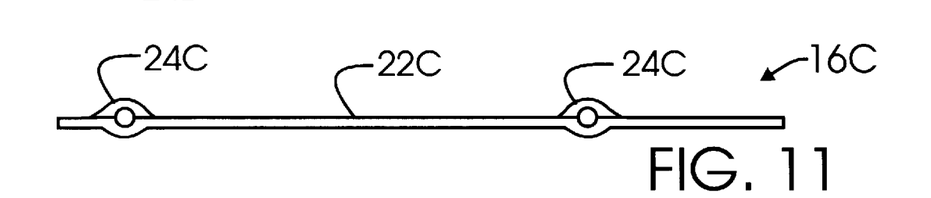
FIG. 11 is a side view of another alternative guidance vane.
Figure 12:
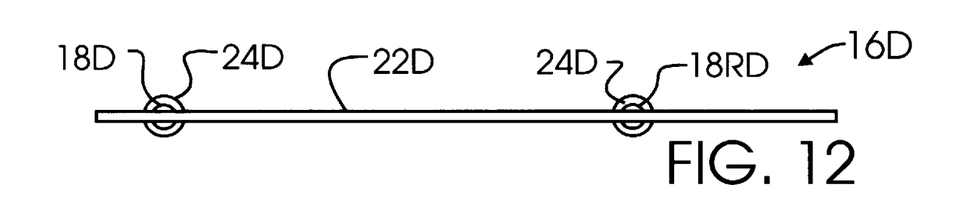
FIG. 12 is a side view of a further alternative guidance vane and pintle structure.

FIG. 10 illustrates a further alternative guidance vane 16B having journals 24B welded to the planar sheet. FIG. 11 illustrates a further alternative guidance vane 16C having lanced journals 24C. FIG. 12 illustrates a further alternative embodiment having split post pintles 18D, 18RD and a flat guidance vane 16D having journal and rearward facing journals 24D joined by abutment which engage the full unsplit section of pintles 18D, 18RD to provide compression and bi-stableness to main vane section 24D. It will be apparent that alternative configurations of pintles 18 and guidance vane 16 are quite viable, and that appropriate selection may be made based upon specific circumstances.

In FIG. 9, the movement of bi-stable vane 16 is diagrammatically shown. Vane 16 is not stable on the CLRP, but is stable in either of the bowed configurations. One configuration is shown in solid line, the other in dotted line.

Figure 15:
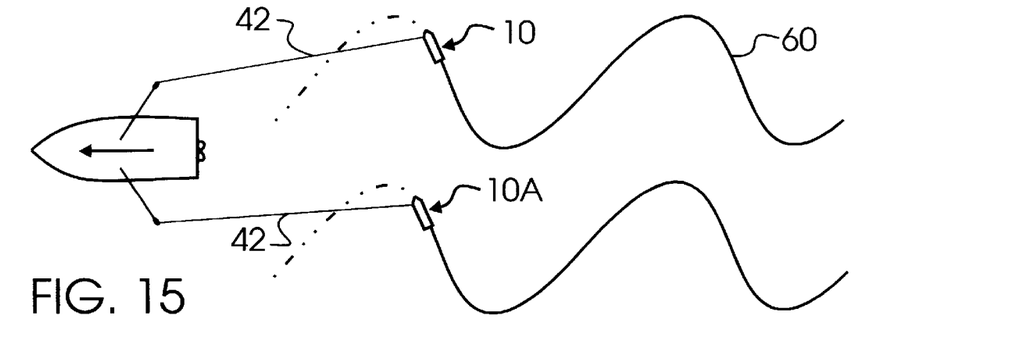
FIG. 15 is a diagrammatic view of the zigzag motion of this invention.

FIG. 15 illustrates the zigzag motion 60 of device 10 behind a boat. Motion 60 is exemplary of an average motion; if adjustable pintle 18R is backed off, the motion 60A will be less severe; if pintle 18R is tightened up to maximize compression of main vane section 22, the zigzag motion will be maximized.

Figure 1:
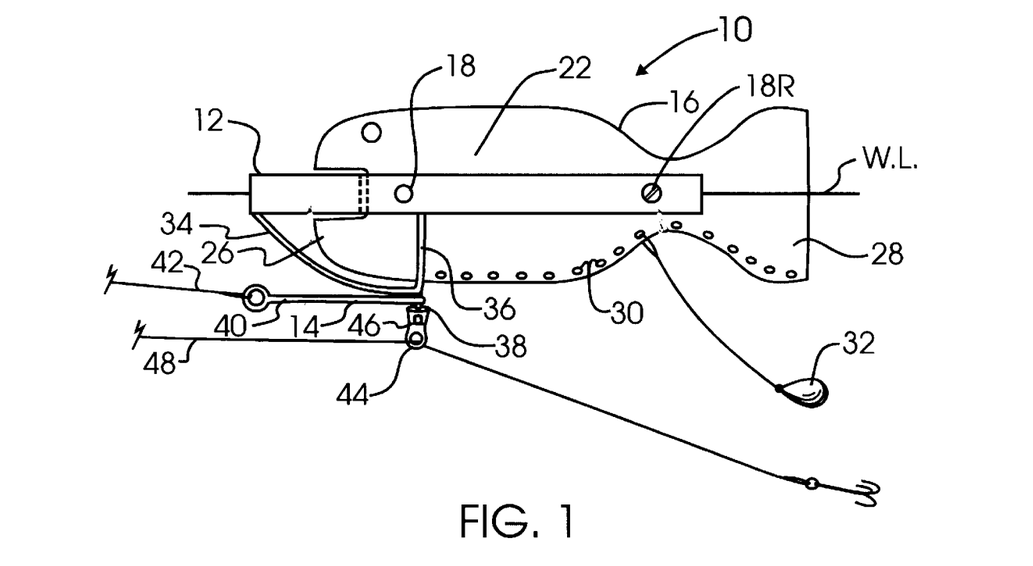
FIG. 1 is an elevational side view of a preferred embodiment of an aquatic device provided in accordance with the principle of the invention and utilizing the methods thereof.
Figure 16:
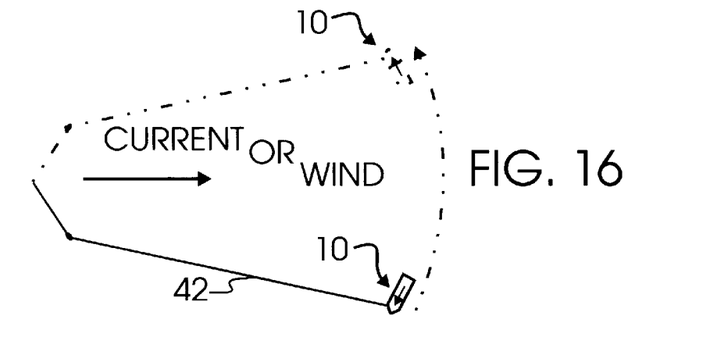
FIG. 16 is a further diagrammatic view of the zigzag motion of this invention.

FIG. 16 illustrates device 10 being used in a river having current, or in a wind, wherein the user is essentially stationary and the relative water current on the submerged portion of the guidance vane 16 provides motive power, and/or the wind blowing upon the upward extending exposed part of guidance vane 16, FIG. 1, provides the motive power. In this application device 10 goes back and forth while tether line 42 remains constant in length, and zigzags when the tether line 42 is being shortened or lengthened.

Figure 17:
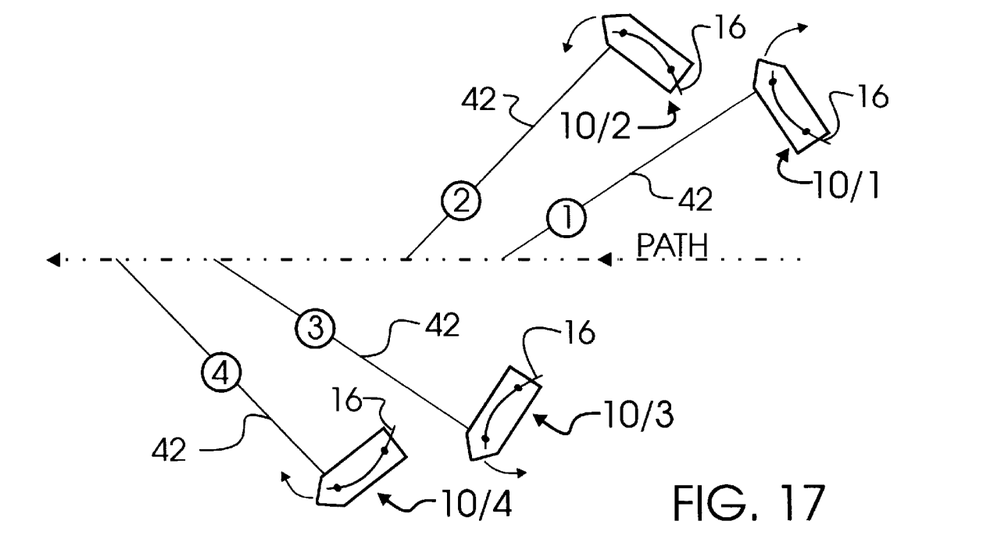
FIG. 17 is an explanatory diagrammatic view of the motion of this invention.

FIG. 17 is a schematic diagram with which the methodology and operation of device 10 of this invention can be explained. Device 10 is operable with a single tether line 42 and without electronics and/or radio of any type. Assuming a tow boat is heading across on the paths from right to left in the path line, device 10/1 is justly shown with its guidance vane 16 bowed bi-stably to port (left from above the device, while looking forward) and device 10 is transversing above the path line shown in the figure. Upon device 10/1 attaining a position farthest off the path line to the starboard side, schematically above in the figure, tether line 42 can be snapped forward to cause a surge of water resistance against vane 16, whereupon main vane section 22 snaps into a starboard position as shown in position 10/2. As motion of device 10/2 continues, the device turns CCW and traverses towards port side, which is schematically shown as across from top to bottom in FIG. 17 to position 10/3, where upon line 42 can again be snapped and the surge of water resistance against vane 16 will snap main vane section 22 back to port side configuration shown in 10/4, whereupon device 10/4 will turn CW and transverse back in a starboard direction, shown schematically from bottom to top in FIG. 17, to re-attain the equivalent of position 10/1, albeit further along the path of the tow boat. It is also possible to make the snap action of vane 16 automatic as drag builds up when device 10 is in the outer positions and should change direction. The main vane section 22, having the largest area, is the structure enabling the line snap or automatic change of vane 16 between its bi-stable positions.

It has been found advantageous to structure adjustable pintle 18R and cam 52 so that cam 52 can be turned to release main vane section 22 from compression, i.e.—no compression, during periods of non-use, storage and the like, to prevent creep or cold flow in plastic vane 16 and prevent vane 16 from taking a set. It has also been found advantageous to provide a handle on the pintle head 50.

In some cases, it may be an advantage to allow or design a vane 16 which is pre-biased to one side or the other of the bi-stable positions. For example, if vane 16 is biased to favor main vane section 22 in the port position, then device 10 will transverse primarily in a starboard direction. The average of the zigzag path will not be directly behind the tow point, as was shown in FIG. 17, but will instead be shifted in the starboard direction. If one device 10 is be pre-biased towards starboard, and the other device 10 to port, several devices 10 may be used simultaneously behind a tow without interference therebetween. In other instances, such as along shallow shorelines, it may be desirable to run along the shallow where the tow can not traverse. Once again, the pre-bias of vane 16 will allow the device 10 to travel without the tow having to travel in the same area.

Figure 18:
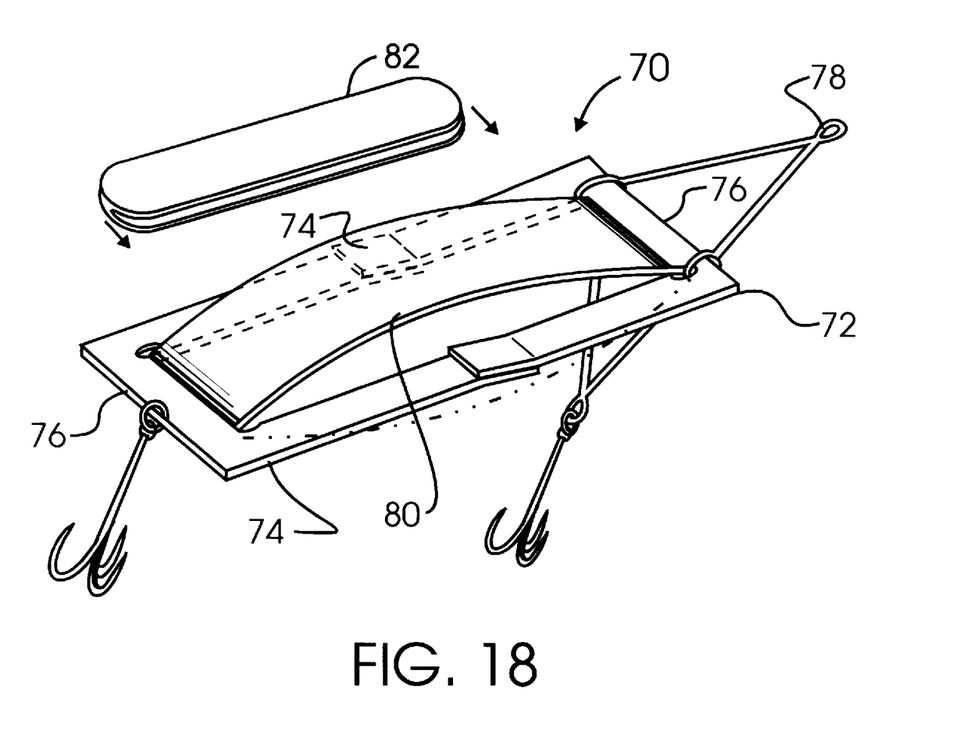
FIG. 18 is a perspective view of an alternative submersible version of this invention.
Figure 19:
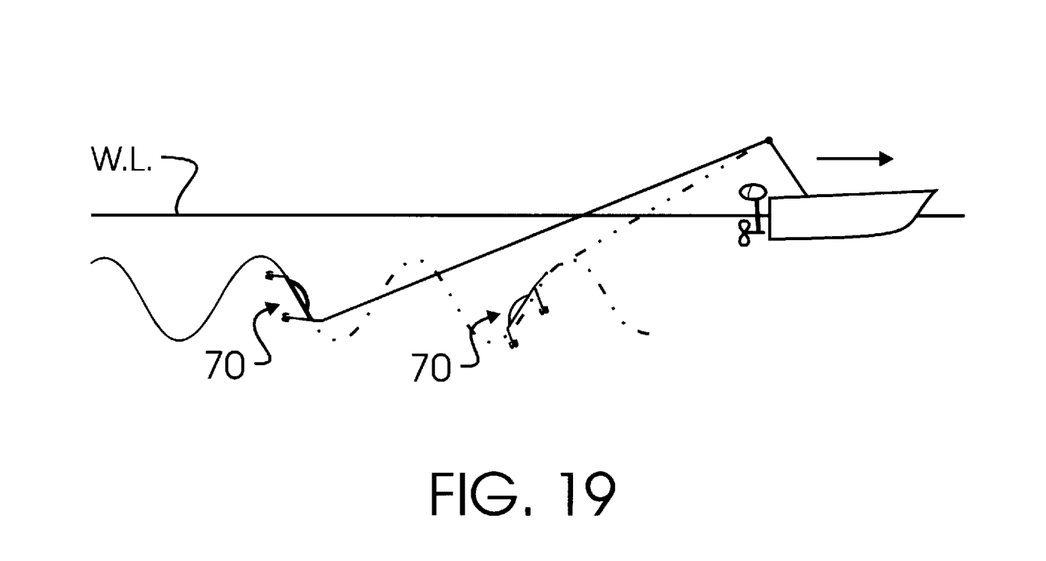
FIG. 19 is a motion diagram for the apparatus of FIG. 18.

FIG 18 illustrates the method and apparatus of this invention embodied in a submersible fishing lure device 70. In device 70, frame 72 is comprised of tension members 74 and end members 76. A front tow bar 78 is provided and swiveled to frame 72, and guidance vane 80 is journaled at it ends to end members 76, which also serve as the pintles. Motion of lure device 70 is shown diagrammatically in FIG. 19 wherein an accentuated up and down, "roller-coaster" motion is provided when device 70 is pulled by a boat or retrieved after casting. When bi-stable guidance vane 80 is bowed up, device 70 turns down. When guidance vane 80 is bowed down, device 70 turns up. Normally, device 70 will be totally submergible and track in a straight line when seen from above or below. However, an optional float 82 may be clipped on either side of device 70 to cause the device to cant in the water and cause a compound up and down and side-to-side zigzag motion, or with sufficient flotation, to zigzag entirely side to side, with float 82 floating above the remaining parts of device 70. Additionally, device 70 may have a pre-biased vane 80 which favors either the up or down bi-stable state. When vane 80 is pre-biased to favor the up state, device 70 will favor diving downwards, and so will track much deeper below the surface of the water. When vane 80 is pre-biased downward, device 70 will skim along the surface of the water. The inventor has determined that in some instances, this surface zigzag my be particularly desirable, such as when attempting to bait bass and other similar fish.

It is also anticipated that either device 10, 10A may have a diving vane structure on it and be submersible, while providing the same motion shown in FIGS. 15–17.

Figure 20:
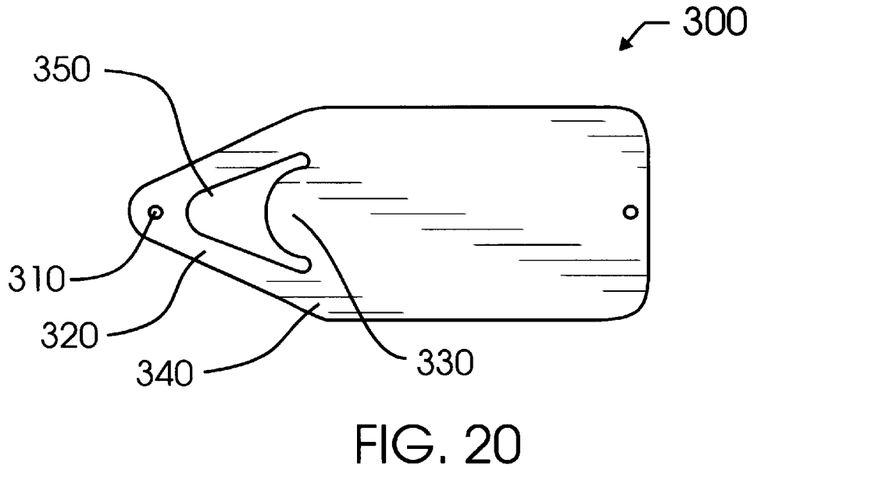
FIG. 20 is a top plan view of a second alternative submersible embodiment of this invention.

FIG. 20 illustrates a second alternative submergible embodiment of the invention which does not require the tensioning frame members of the previous embodiments. In this embodiment, a device 300 includes a leading edge connection point 310 through which a line or swivel may pass, to thereby provide connection to a typical tow line. Flaring transversely from connection point 310 is a tow structure 320 which has a generally open region 350 in the center, which allows fluid to pass therethrough. A nose structure 330 protrudes into open region 350 from vane 360. Vane 360 is connected to tow structure 320 through flexible connections 340.

Device 300 is preferably formed from a single piece of relatively strong and resilient material such as stainless steel, rubber, molded plastic, plastic sheet, or other similar material, and any known reinforcing materials such as Kevlar, glass or other fibers, fabrics or materials may be provided. The forming process is not restrictive, and so device 300 may be stamped, punched, molded, or formed in any other suitable process.

Figure 21:
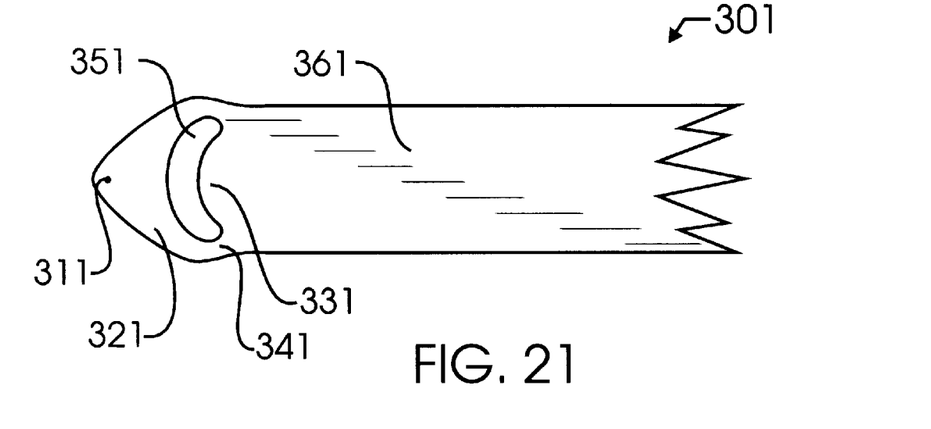
FIG. 21 is a top plan view of a third alternative submersible embodiment of this invention.

Additional alternative embodiments are shown in FIGS. 21–31 which are numbered with like numbers for like elements, wherein the ones digit indicates the particular embodiment. So, for example, FIG. 21 shows device 301 which has a more rounded tow structure 321 than tow structure 320 of device 300. Each of these devices 300–308 operate according to the same or similar principles, and may be formed from similar materials.

There are several features which have been determined to be relatively critical to the design and operation of devices 300–308. Specific reference will be made to device 304 of FIG. 24, though it will be understood that the following description applies to the others of devices 300–308 as well. Device 304 is illustrated as a fishing lure and will therefore be expected to travel through the water for extended durations, such as may be encountered during trolling for several hours or days. As a consequence, flexible connections 344 must be able to survive many thousands of flexures without failure. The selection of material, together with the geometry of connections 344 and the adjacent opening 354 and nose 334 is relatively critical. Sharp, relatively acute angle intersections between the nose 334 and tow structure 324 at connection 344 will lead to significant stress concentration in the vicinity of connection 344, which will lead to accelerated failure. In other words, shaping opening 354 to have sharp edges at the transverse extremes adjacent connection 344 will lead to premature failure during the bi-stable flexures. However, by keeping the perimeter of opening 354 relatively rounded, as illustrated, the stresses are not concentrated and so many more materials are suitable.

Figure 24:
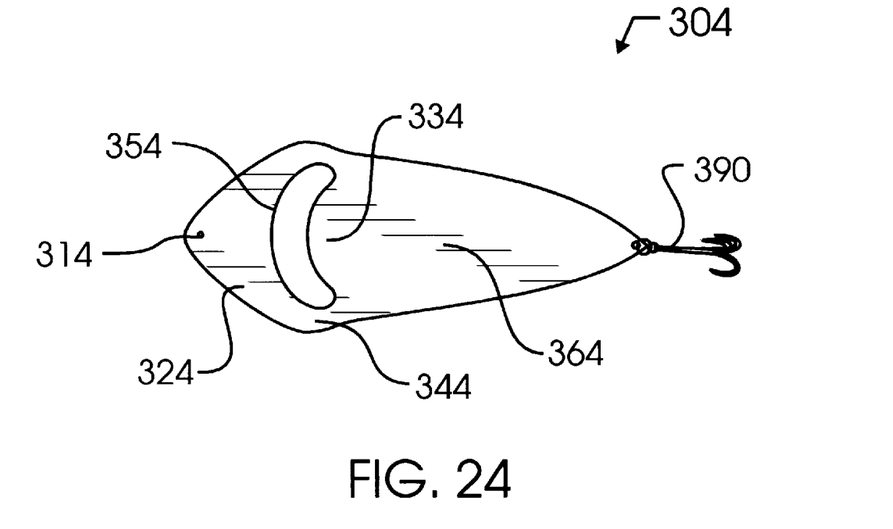
FIG. 24 is a top plan view of a sixth alternative submersible embodiment of this invention.
Figure 25:
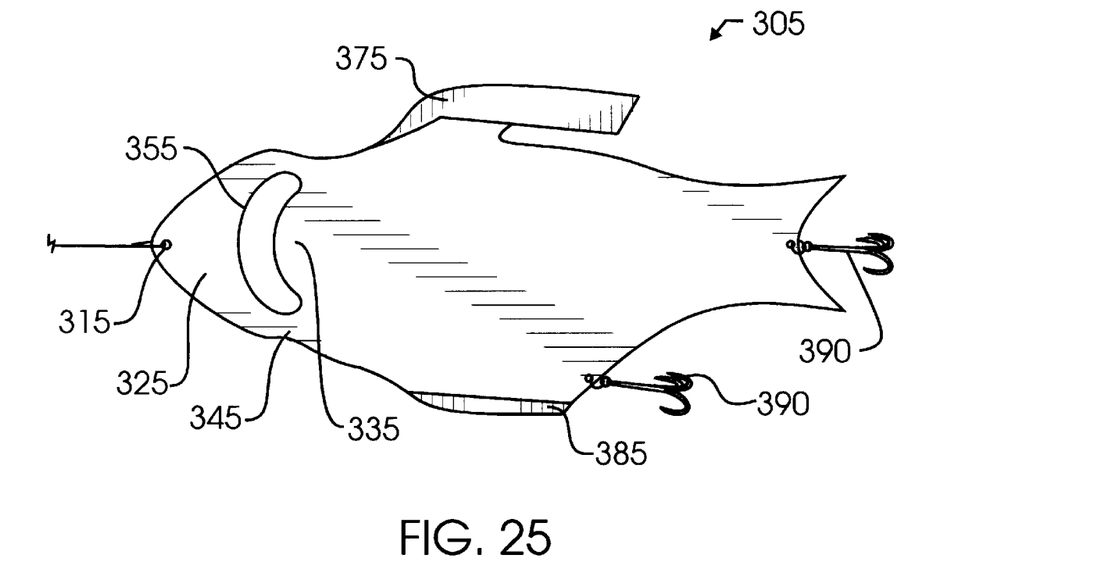
FIG. 25 is a side elevational view of a seventh alternative submersible embodiment of this invention.

Vane 364 has been determined to be quite variable, as shown by these various embodiments. For purposes of illustration, vane 364 may be thought of as a kite tail. Without vane 364, device 304 will not function properly. However, vane 364 may take a multitude of shapes and geometries, whereby the limiting factor seems to be whether vane 364 provides some opposition to motion normal to the plane of device 304.

Figure 31:
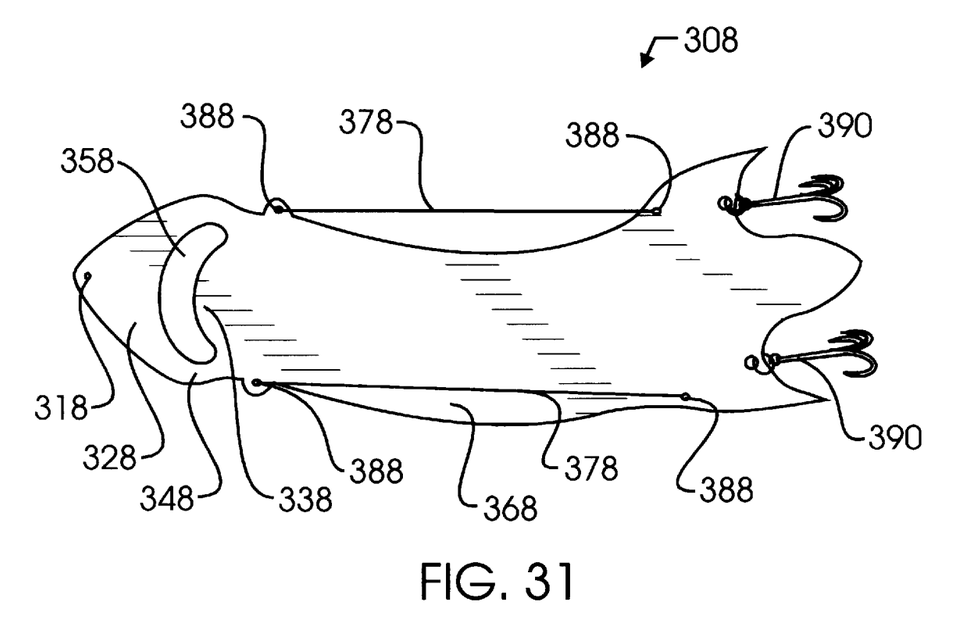
FIG. 31 is a projected view of a tenth alternative submersible embodiment of this invention.

Nose 334 serves to redirect the flow of water through opening 354, but nose 334 may also take on various shapes and geometries. While the geometry illustrated is obviously preferred, various other shapes and geometries are contemplated. For example, the addition of tensioning wires as shown in FIG. 31 allows nose 338 of that embodiment to be flat or non-existent, though, again, as illustrated, nose 338 is preferred to extend somewhat into opening 358. Varying the size of opening 354 and the relative protrusion of nose 334 into opening 354 has been determined to affect the operation of device 304, but this operation is also interrelated to the relative stiffness and other characteristics of the material from which device 304 is made. As a result, no hard and fast rules have been developed from which the exact geometries and surface areas may be made. Nevertheless, one of ordinary skill in the field will readily experimentally vary the nose 334 and opening 354 to meet desired performance characteristics for any given particular material. Some fairly apparent generalizations may be made, nevertheless. For example, a stiffer material will require more force thereon to accomplish a given switch from one state to the other. Therefore, connections 344 must be relatively narrower for a stiffer material to gain the same zigzag motion in the water as would be gained otherwise. Alternatively, opening 354 and nose 334 may each be enlarged, to thereby redirect more water and gain the greater force necessary to overcome the stiffer material. By varying the dimensions of elements 334–354, a wider variety of materials and zigzag behaviors may be accepted and designed for.

The unique design features of FIG. 21 include a smaller, more rounded opening 351, as aforementioned. One conceived of embodiment included two openings 351 each longitudinally displaced from the other, to form two "mouths" in device 301, but no significant effects were observed in the performance of device 301. The device of FIG. 21, by way of illustration only, may be made from a common stainless steel sheet material such as type 304, and the device may be four inches in length and two inches wide. The steel in this case should be three or four thousandths of an inch thick.

Figure 22:
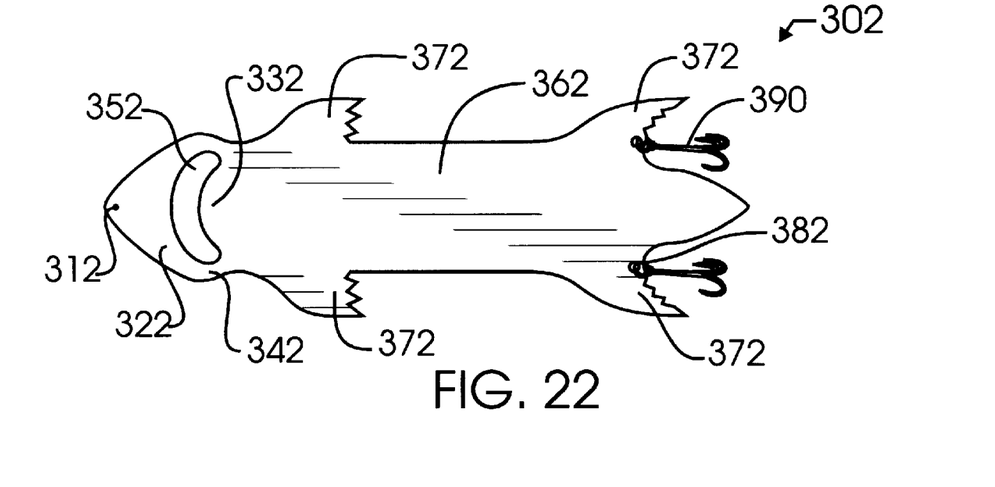
FIG. 22 is a top plan view of a fourth alternative submersible embodiment of this invention.
Figure 23:
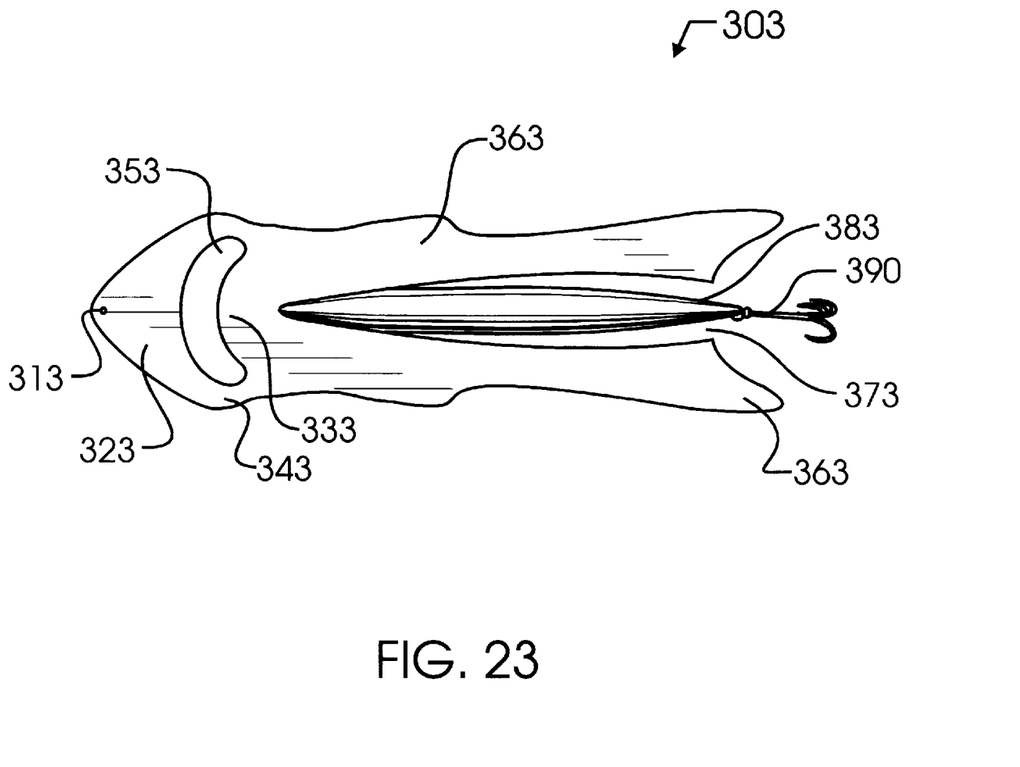
FIG. 23 is a top plan view of a fifth alternative submersible embodiment of this invention.

Device 302 of FIG. 22 includes the provision of four small wings 372 and two hooks 390, the hooks 390 attached to vane 362 at holes 382. Small amphibious or winged creatures may be approximated with features similar to wings 372, which may take any desirable geometry. In FIG. 23, larger, longitudinally elongated wings are formed by separating vane 363 with a longitudinal opening 373. While two wings are shown on vane 363, it is also possible to completely remove either one of these two wings and device 303 will still function properly. While not necessary for performance, an additional central material 383 may be inserted within opening 373 which may be of different composition from vane 363, and which may have a hook 390 trailing therefrom. In a preferred embodiment, vane 363 may be formed from thin stainless steel and central material 383 may be formed from relatively soft rubber having thickness substantially greater than the material of vane 363. In device 304, vane 364 is shown as being substantially smaller than any of the other embodiments. In practice, vane 364 must provide resistance to movement normal to the plane formed by device 304, in order to achieve the zigzag motion. The amount of this resistance will once again depend upon several variables, such as the rigidity of the material and the size and characteristics of connections 344. Other materials may also be used to form vane 364 that may be different from the remaining components of device 304. For example, soft rubber material in the shape of a snake or eel may extend from nose 334 which, when traveling through the water in the zigzag motion of the invention, will strongly resemble a water snake or eel. Device 305 of FIG. 25 includes a float 375 and a sinker 385 attached at transverse edges of vane 365, which will cause vane 365 to orient vertically in water. This orientation will most nearly resemble a fish, and, in fact, the zigzag motion will also replicate the actual motion of many fish. As with the other embodiments, one or more hooks 390 may be provided for the purpose of catching fish or other aquatic life by virtue of the baiting characteristic of device 305.

Figure 26:
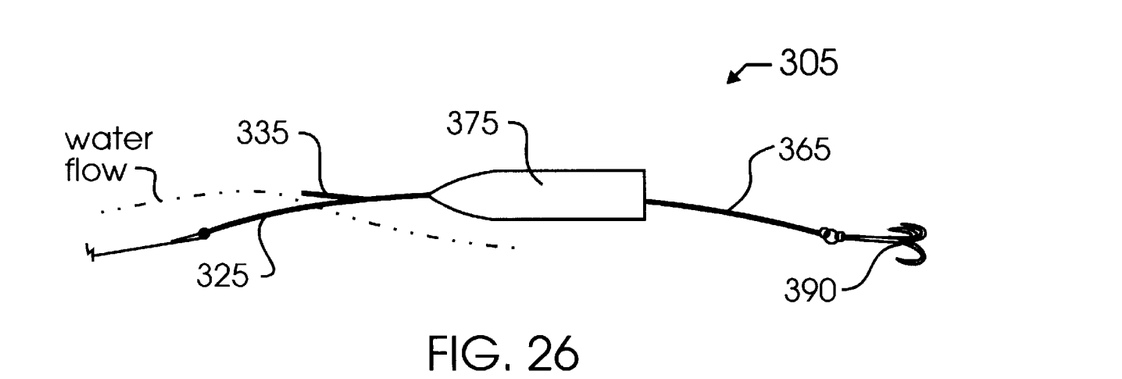
FIG. 26 is a top plan view of the structure of FIG. 25.
Figure 27:
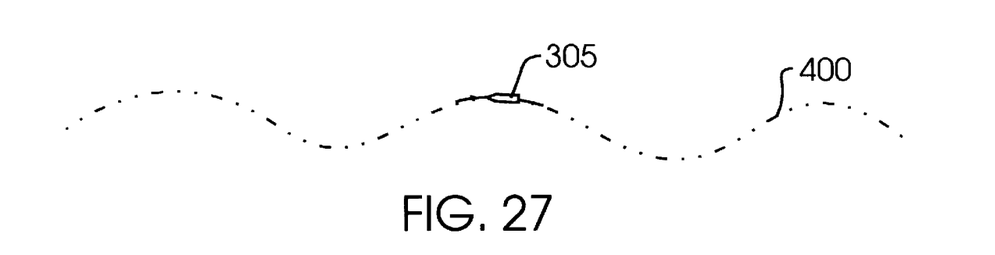
FIG. 27 is a top diagrammatic view of the zigzag motion of the structure of FIG. 25 through water.

FIGS. 26 and 27 illustrate the operation of these devices 300–307, with particular reference to device 305. As can be seen from FIG. 26, which is a top view of device 305 as might be obtained looking vertically down into the water through which device 305 is passing, when vane 365 is bowed to the starboard side nose 335 protrudes forward. Because of the tendency for nose 335 to continue to point forward, water will flow along the path line shown, which further reinforces nose 335 staying in a straight or even slightly starboard direction. The water drag created by nose 335 leads device 305 to drift in a starboard direction. Eventually device 305 will be pulled offset from the tow line sufficiently that water will divide across nose 335. Just subsequent to the more even water divide, nose 335 will be caught by water passing through opening 355 and be pulled in the port direction, which will cause vane 365 to also begin to move in the port direction. However, as aforementioned, vane 365 resists immediate movement normal to the relatively planar surfaces, which prevents device 305 from stalling in the water. The gradual zigzag undulations occur from the interaction of nose 335 with the water and the resistance to change brought on by vane 365. The resulting path is illustrated schematically, again from a top view looking into the water, in FIG. 27. The motion illustrated is the same for any of devices 300–308. However, device 305 has float 375 and sinker 385 attached thereto, resulting in a full ninety degree rotation of device 305 in the water relative to the other devices. So, while FIG. 27 is viewed from above looking down into the water, showing horizontal zigzags, the other devices in the series 300–308 would follow the path shown in FIG. 19 with vertical zigzags.

Figure 28:
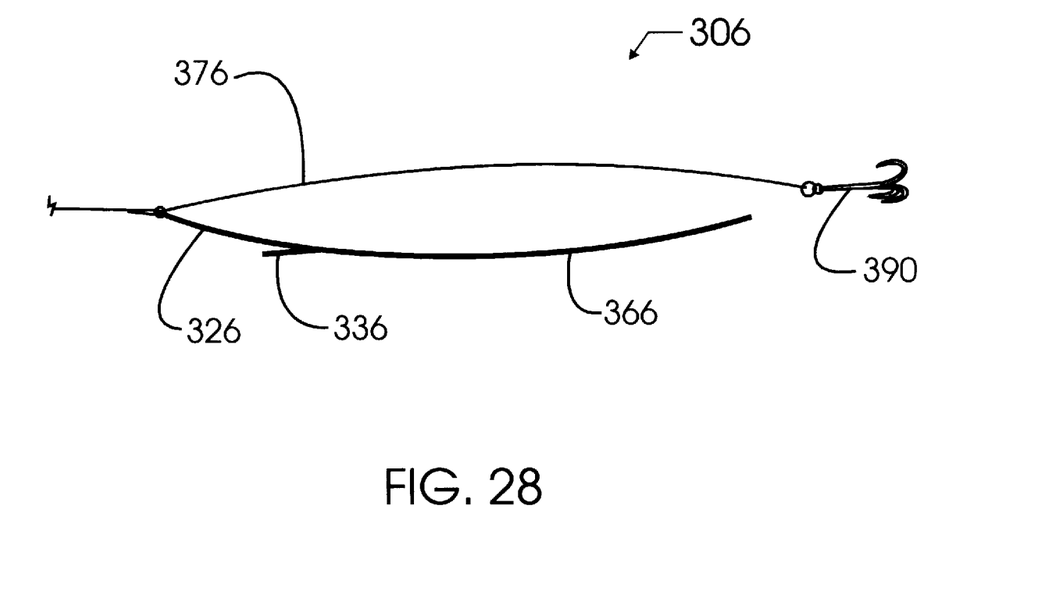
FIG. 28 is a side elevational view of an eighth alternative submersible embodiment of this invention.
Figure 29:
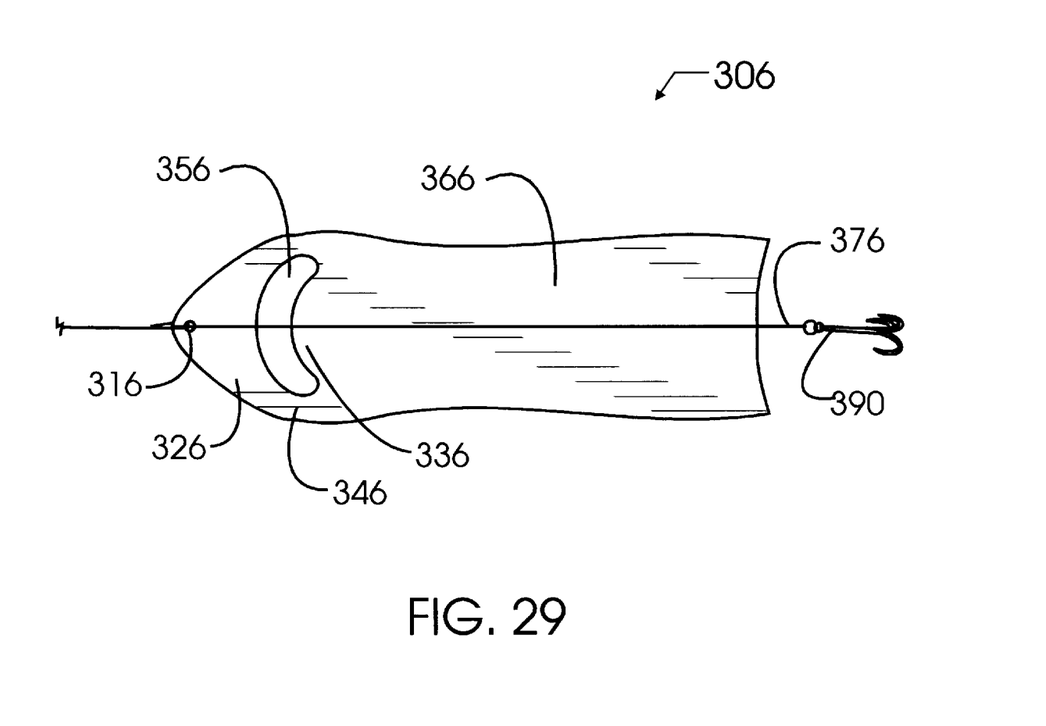
FIG. 29 is a top plan view of the eight alternative submersible of FIG. 28.

FIGS. 28 and 29 show device 306, which separates hook 390 therefrom and connects hook 390 directly to connection point 316 by use of a relatively strong and rigid wire 376. This embodiment is particularly advantageous when the materials used for the planar portion of device 306, such as vane 366, are manufactured from materials having relatively low yield or tensile strengths. In those instances, there may not be sufficient mechanical strength within vane 366 to carry hook 390 when a fish is attached thereto. The use of wire 376 resolves this issue without adversely impacting the movement of device 306 through the water.

Figure 30:
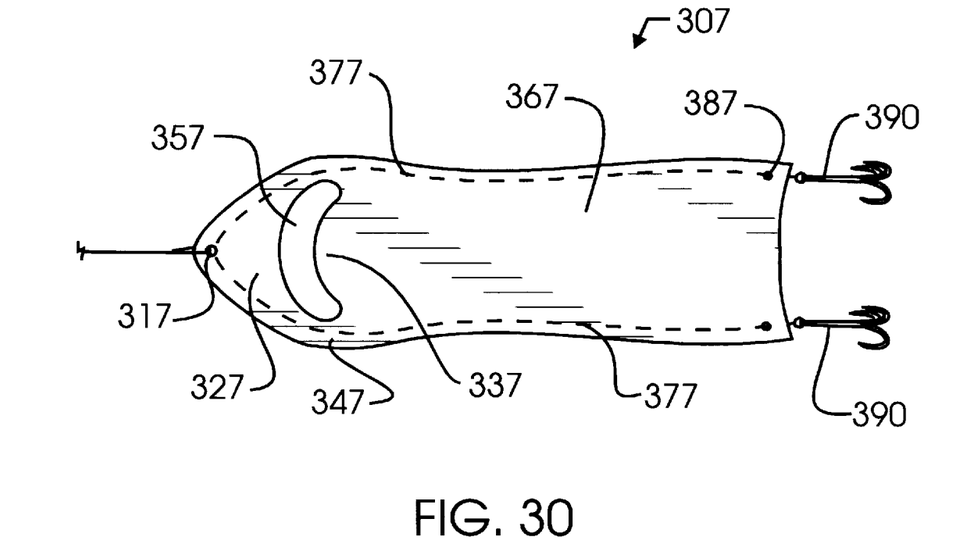
FIG. 30 is a top plan view of a ninth alternative submersible embodiment of this invention.

FIG. 30 illustrates a further alternative which also addresses strength issues. Shown therein, wires or strengthening strings 377 may either be woven back and forth normal to the plane of vane 367, as shown, or may alternatively be embedded directly within the material. Providing these wires 377 again reinforces the device 307 to provide for larger loads upon hooks 390.

FIG. 31 illustrates a hybrid between devices 300–307 and device 70 of FIG. 18. By adding tensioning wires 378 thereto at holes 388 within vane 368, a bi-stable operation is achievable and nose 338 is not necessary for operation. Nose 338 is preferred, but could be eliminated to leave a leading edge similar to that of front end member 76 of FIG. 18. While there may be some instances where the use of these tensioning wires together with nose 338 is preferred, particularly where reinforcement may simultaneously be provided, in most instances one of the others of devices 300–307 will typically be preferred due to lower manufacturing costs.

I have expectations that the basic apparatus 10, devices 300–308 and the methods herein described are new and useful in a variety of aquatic devices including otters, fish equipment, testing devices, photography, aquatic toys, aerial devices and so forth. For example, while the preferred embodiments illustrate a fishing or boat type tow line, the tow line may take many forms, depending upon the exact application for the apparatus and device. The otters may be used to access areas along shores or in shallow areas not otherwise accessible by boat. A camera may be provided therewith, or water and soil samples may be taken therewith. Underwater cameras may also be provided with the devices of the invention, and views from the perspective of aquatic life may be recorded. In the case of water toys, provisions may also be made for a person to ride upon or be dragged by device 300, with the zigzag motion controlled by the inclusion or exclusion of floats and sinkers to be vertically oscillating, horizontally oscillating, or some compound motion therebetween. Other devices or shapes such as animations or simulations may also be provided to the devices illustrated herein, and the devices may be molded to take on features in three dimensions as opposed to the generally planar features presented herein. In particular, device 305 may be molded to have some depth which more nearly resembles a fish in all three dimensions. Such modifications may be made to the other devices illustrated herein as well. In further conceived extensions of the invention, the invention may be applied to any fluid medium through which a vane may pass, including air and other gasses and any type of liquid. For example, the teachings herein can also be applied by those skilled in the field of aerial devices to devices which are towed behind airplanes, automobiles, motor boats and the like, with appropriate modifications to dimensions and relative proportions, the requirements for which were described hereinabove. In addition to simple zigzag banners and the like, bird devices may be tethered from a string and through the zigzag motion of the invention, simulate aerial flight and wing flapping. Kites may also be designed, taking advantage of the vane pre-biasing described previously, to offset from the ground upwards in the wind.

Although other advantages may be found and realized, and various modifications may be suggested by those versed in the art, be it understood that I embody within the scope of the patent warranted hereon all such embodiments as reasonably and properly come within the scope of my contributions to the arts and knowledge.

What is claimed is:

1. A fishing bait which may be towed through water and which will produce a zigzag motion therein, comprising:
   a leading edge connection point to which a tow line attachment may be made;
   a resilient, unitary body attached to said leading-edge connection point, having:
   a) a planar tow structure which flares transversely from said leading edge connection point;
   b) an opening in said tow structure flare;
   c) a flexible nose structure adjacent said tow structure that engages said tow structure and extends into said opening; and
   d) a vane adjacent and trailing said nose structure, said vane comprising a majority part of a total surface area of said fishing bait;
   wherein said flexible nose structure is bi-stable during said towing behind said leading-edge connection point, alternating between a first state directing water through said opening in a first direction and a second state directing water through said opening in a second direction opposite said first direction.

2. The bait of claim 1 wherein said vane trails freely behind said nose structure.

3. The bait of claim 2 wherein said vane has a first major surface and said vane resists movement of said bait along an axis normal to said major surface.

4. The bait of claim 3 wherein said vane has features that simulate aquatic life.

5. The bait of claim 3 wherein said vane has features that simulate birds.

6. The bait of claim 4 wherein said vane is comprised by a molded organic compound.

7. The bait of claim 1 further comprising a float biasing said bait to zigzag in a plane which is not vertical.

8. The bait of claim 1 further comprising a sinker biasing said bait to zigzag in a plane which is not vertical.

* * * * *